United States Patent [19]

Jarrell

[11] 3,998,036
[45] Dec. 21, 1976

[54] POD COMBINE
[75] Inventor: Virgil N. Jarrell, Viola, Del.
[73] Assignee: Chisholm-Ryder Company, Inc., Niagara Falls, N.Y.
[22] Filed: June 7, 1974
[21] Appl. No.: 477,202
[52] U.S. Cl. .............................. 56/13.5; 56/12.8; 56/130; 130/30 H
[51] Int. Cl.² ..................................... A01D 45/24
[58] Field of Search ................ 130/30 R, 30 H, 130/30 F, 30 G, 30 E; 56/13.5, 126–130, 11.9, 14.6, 12.8

[56] References Cited
UNITED STATES PATENTS

| | | | |
|---|---|---|---|
| 2,608,973 | 9/1952 | Coons | 130/30 R |
| 2,768,628 | 10/1956 | Hermanson | 130/30 H |
| 2,768,628 | 10/1956 | Hermonson | 130/30 H |
| 3,589,110 | 6/1971 | Schreiner | 56/14.6 |
| 3,705,483 | 12/1972 | Jarrell et al. | 56/13.5 |
| 3,709,231 | 1/1973 | Looker et al. | 130/30 H |
| 3,769,988 | 11/1973 | Burenga | 130/30 H |
| 3,797,503 | 3/1974 | Dentant et al. | 130/30 R |

Primary Examiner—Russell R. Kinsey
Attorney, Agent, or Firm—Stanley J. Price, Jr.; John M. Adams

[57] ABSTRACT

The pod combine includes a harvester and thresher mounted in tandem on a self-propelled mobile frame. The harvester removes the unopened pods and a portion of the foliage and vines from the plants. A twin screw feed device feeds the harvested material to the thresher. The thresher includes a foraminous reel arranged to be driven in preselected opposite directions and an axially positioned impeller. The impeller includes a plurality of beaters with open portions to minimize convective currents within the thresher. A product collecting device is positioned below the foraminous reel and includes side boards over a housing that oscillate linearly to deposit the shelled product on an endless conveyor and a separator device is arranged to separate the foliage from the shelled product. The separator includes a material distributing device which permits the foliage to be separated from the shelled product by an air blast.

13 Claims, 12 Drawing Figures

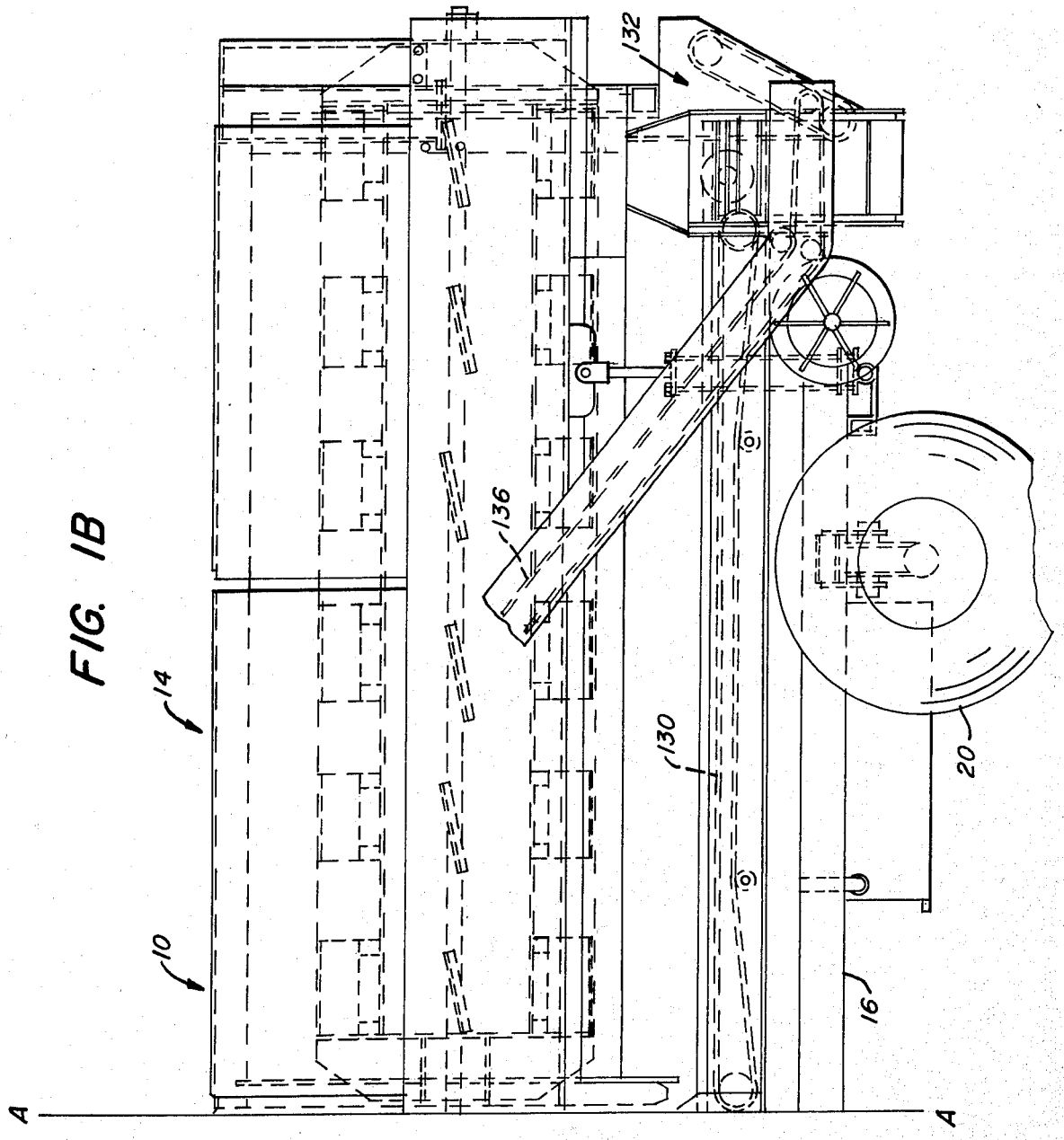

POD COMBINE

BACKGROUND OF THE INVENTION

1. Field of the Invention

This invention relates to a pod combine and more particularly to a pod combine that includes a portable harvester and a thresher.

2. Description of the Prior Art

U.S. Pat. No. 3,705,483 entitled "Multi-Row, Multi-Crop Harvester" discloses a self-propelled harvesting machine for harvesting different types of crops such as snap beans, lima beans, peas, dry beans and the like. The harvester is arranged to strip the foliage and product in the pod from the plants leaving a substantial portion of vines still rooted in the ground. The pods and extraneous foliage are deposited in a receiver and transported to a processing station where the product in the pods and the extraneous foliage are introduced into a thresher or viner similar to that disclosed in U.S. Pat. No. 2,768,628 entitled "Viner". In the fixed viner or threshing device the pods are opened and the product, i.e. peas, lima beans, soybeans and the like, is separated from the pods and extraneous foliage.

U.S. Pat. No. 3,769,988 discloses a legume harvester with an auger feed that harvests the leguminous crop and conveys the leguminous crop and extraneous vines and foliage by means of a rotating auger into a threshing device where the pods are opened and the shelled crop collected in a receiver. The harvester disclosed in U.S. Pat. No. 3,769,988 includes a screw type conveyor to convey the material from the harvester portion of the machine to the auger connected to the impeller. A plurality of impellers with radially extending beaters are positioned within the thresher portion of the machine to open the pods and collect the product. The auger type feed connected to one of the impellers limits substantially the volume of product that can be processed during a given period of time and, therefore, limits the productivity of the harvester.

There is a need for a mobile combined harvester and thresher that harvests at a high rate of speed and efficiently separates the product from the pods and foliage and collects the product.

SUMMARY OF THE INVENTION

In accordance with the hereinafter described invention, there is provided a pod combine for harvesting the edible product of leguminous plants that includes both a harvester and a thresher mounted in tandem on a mobile frame. The harvester is arranged to remove the unopened pods and a portion of the foliage and vines from the plants. The thresher is arranged to open the pods and remove the product therefrom and separate the product from substantially all of the pods, vines and foliage. A feed means is provided for feeding the material harvested by the harvester into the rotating reel portion of the thresher. Conveying means are provided for conveying the shelled product and a minor portion of the foliage discharged through the rotating reel to a separator. The separator includes means to separate the shelled product from the foliage and convey the product from the separator to a storage means.

The feed means to feed the product, foliage and vines from the harvester to the thresher includes a pair of screw type conveyors extending longitudinally therebetween. The harvested material is conveyed by an endless belt conveyor into the pair of screw type conveyors of the feed means. Suitable drive means are provided to rotate the screw conveyors in timed relation to convey the material into the inlet portion of the thresher reel. A pair of oscillating arms are provided to feed the material discharged by the endless conveyor into the twin screw conveyor.

The thresher includes a reel rotatably mounted on pairs of drive wheels to permit the reel to rotate in either direction. A housing surrounds the reel and includes a pair of inclined sideboards adjacent a longitudinal endless conveyor positioned beneath the endless reel. The sideboards are arranged to oscillate linearly to prevent the product from accumulating on the inner walls of the housing and deposit the product on the endless conveyor.

A separator device is provided adjacent the discharge end of the longitudinally extending endless conveyor where the shelled product is separated from the remaining foliage. The separator includes a distributor that distributes the product from the endless conveyor as a substantially even curtain into an air blast where the foliage is impinged on an inclined endless conveyor and the product falls by gravity onto a transverse endless conveyor.

The thresher reel includes a plurality of longitudinally extending ribs that have a vertical wall portion and an inclined wall portion. The reel is arranged to rotate in one direction to impinge certain types of pods on the vertical portion of the ribs and in the opposite direction to impinge tender products, such as peas, on the inclined portion of the ribs to thus minimize damage to the product during the shelling operation.

The thresher includes a single impeller positioned axially within the reel and driven by separate drive means to rotate the impeller at preselected speeds. The impeller has a plurality of radially extending beaters or vanes. Certain of the beaters are angularly positioned on the impeller to convey the material inroduced into the reel toward the discharge portion of the reel. The beaters have openings therein that minimize the propeller effect and air currents from propelling and impinging the material against the inner surface of the reel.

Accordingly, the principal object of this invention is to provide an improved feeding device to convey the harvested product to the thresher.

Another object of this invention is to provide a pod combine having improved apparatus for collecting the product discharged through the reel.

A further object of this invention is to provide an improved pod combine having a separator device to efficiently separate the foliage from the shelled product.

A still further object of this invention is to provide a thresher that efficiently separates the product from the pods.

These and other objects of this invention will be more completely disclosed and described in the following specification, the accompanying drawings and the appended claims.

BRIEF DESCRIPTION OF THE DRAWINGS

FIG. 1B is a view in side elevation of the rear portion of the combine.

DESCRIPTION OF THE PREFERRED EMBODIMENTS

Figure 1A:
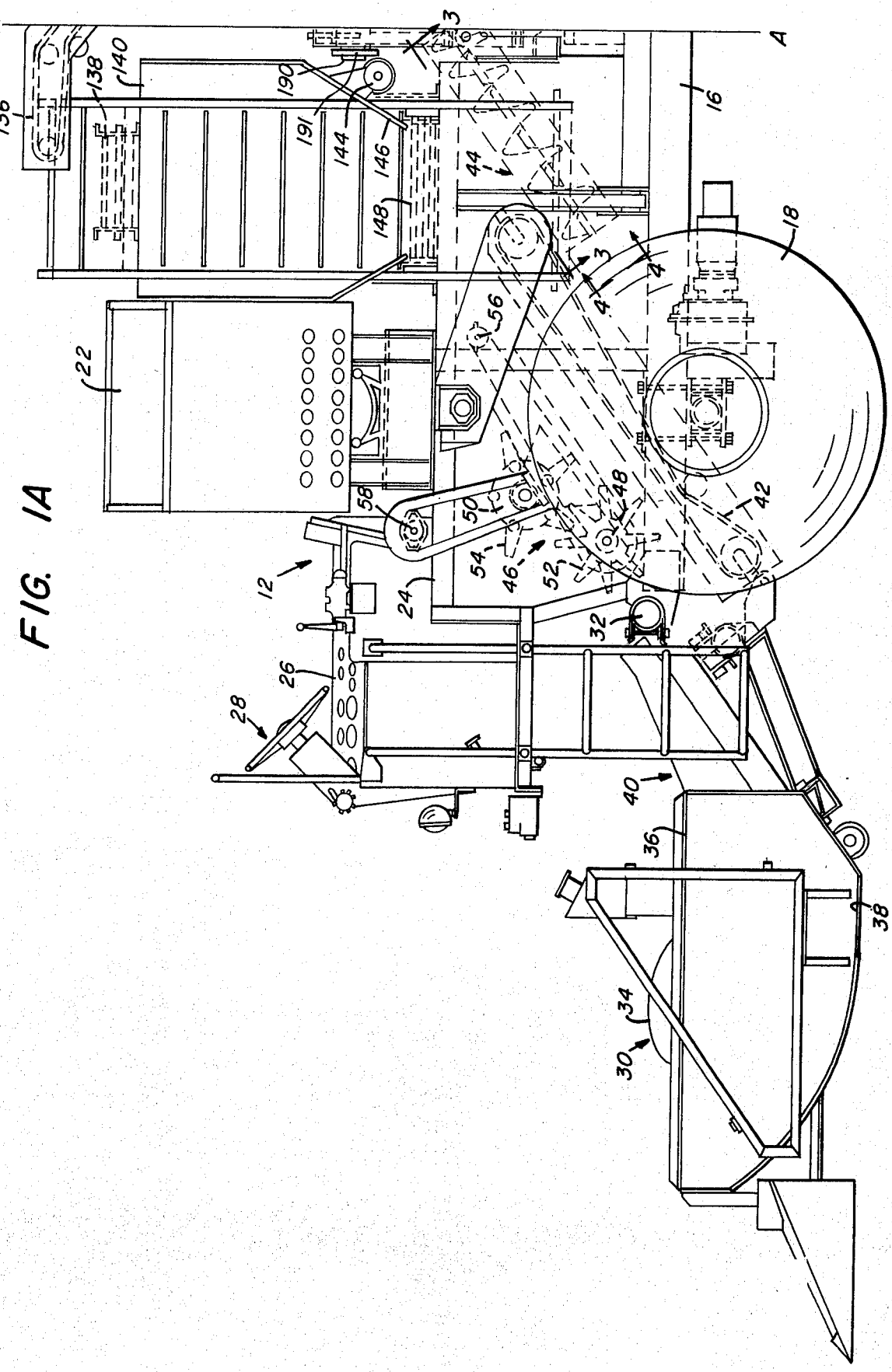
FIG. 1A is a view in side elevation of the front portion of the combine.

Referring to the drawings and particularly FIGS. 1A and 1B the combine generally designated by the numeral 10 includes a harvester portion 12 and a viner or thresher portion 14. The harvester and thresher portions are mounted on a main frame 16 which, in turn, is mounted on a pair of front propelling wheels 18 and a pair of rear wheels 20. A suitable engine 22 is mounted above the propelling wheels 18 on a frame member 24 and is arranged to propel the combine 10 and to supply fluid under pressure to the later discussed hydraulic drive motors for the driven components of the combine 10. A driver's platform 26 is also mounted on frame 24 in front of the engine 22. Suitable steering apparatus 28 is provided to steer the combine during the harvesting and threshing operation.

The harvester portion 12 of combine 10 is similar to that illustrated and described in U.S. Pat. No. 3,705,483 entitled "Multi-Row, Multi-Crop Harvester" assigned to the assignee of the instant invention and will not be described in detail. The disclosure of U.S. Pat. No. 3,705,483 is incorporated herein by reference.

The harvester 12 includes a picker mechanism generally designated by the numeral 30 that is secured to a transverse bar 32 mounted on the front end of main frame 16. The picker mechanism 30 is preferably connected to the front end portion of main frame 16 to change its elevation and follow undulations in the ground over which the combine 10 travels during the harvesting of crops. The picker mechanism 30 includes a tined reel 34 mounted transversely in the picker mechanism forwardly extending housing 36. Suitable drive means are provided for rotating the tined reel 34 in a direction to lay the plants rearwardly over a plant engaging roller (not shown) and onto the upper surface 38 of the transverse plate positioned beneath the tined reel 34 and forming a part of the housing 36. The tined reel 34 is arranged to strip the foliage and crop from the plants without uprooting to a great extent all of the plant stems. The picker mechanism 30 has a trough 40 extending rearwardly from the housing 36 on which the stripped foliage and crop are conveyed toward the main frame 16. Within the trough 40 there may be provided an endless conveyor to transport the material to a second endless conveyor 42. The crop is dumped on the second endless conveyor 42 and conveyed upwardly thereon toward the product feed apparatus generally designated by the numeral 44 and illustrated in detail in FIGS. 3, 4 and 5.

While the stripped foliage and crop are conveyed on conveyor 42 the crop is acted upon by a cluster breaker assembly generally designated by the numeral 46. The cluster breaker assembly 46 includes a front rotor 48 and a rear rotor 50; both positioned above the upper flight of endless conveyor belt 42 and extending transversely thereacross. The rotor 48 has flat blade like arms 52 which are spaced circumferentially therearound. The rotor 50 has similar blade like arms 54 spaced circumferentially therearound and arranged to penetrate the spaces between the arms 52 of rotor 48. The rotor 48 is arranged to pick up clusters of crop from the upper reach of endless conveyor 42 and carry the cluster upwardly toward the descending arms 54 of rotor 50. The shearing action between the arms 52 and 54 separates the clusters and individualizes the crop.

Drive means, such as a hydraulic motor, generally designated by the numerals 56 and 58 rotate the rotors 48 and 50 in timed relation with each other. A suction fan may be provided adjacent the endless conveyor 42 to separate at least a portion of the foliage from the crop before the crop is introduced into the product feed apparatus 44.

Figure 3:
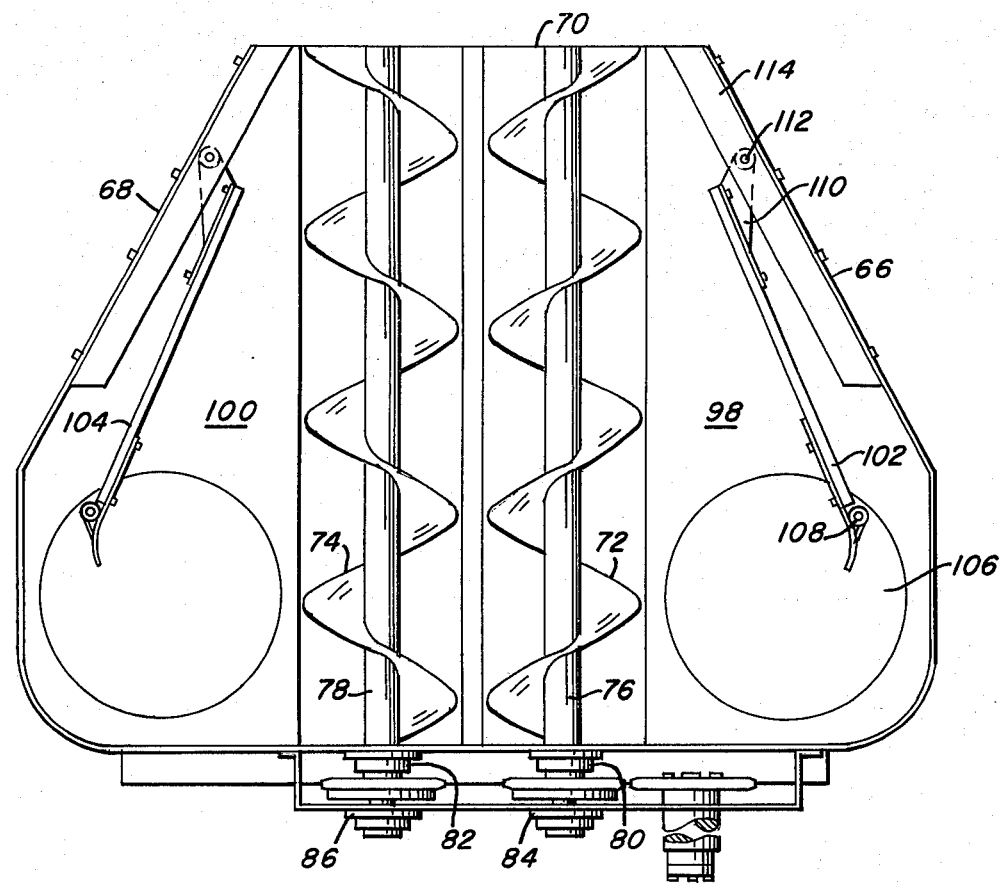
FIG. 3 is a fragmentary view of the crop feeding apparatus taken along the line III—III of FIG. 1A.
Figure 4:
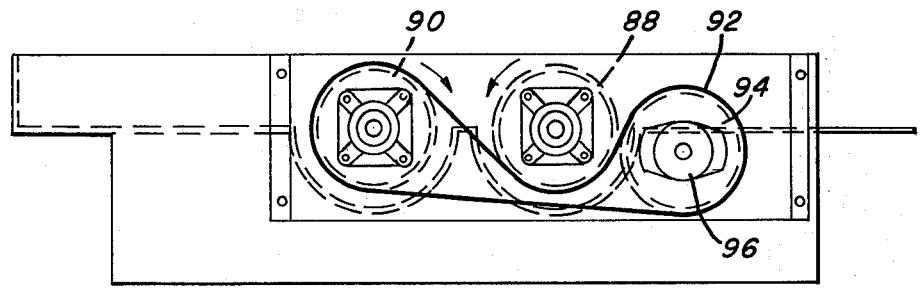
FIG. 4 is a fragmentary view in end elevation of the front end of the crop feeding apparatus illustrated in FIG. 3.
Figure 5:
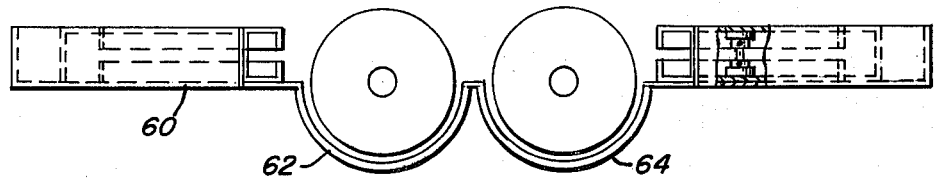
FIG. 5 is a view in end elevation of the other end portion of the crop feeding apparatus.

The crop from the discharge end portion of endless conveyor 42 is deposited in the product feed apparatus 44 illustrated in FIGS. 3, 4 and 5. The product feed apparatus is arranged to convey the product to the inlet end portion of the viner or thresher 14. The diameter of the inlet opening into the cylindrical portion of the viner reel is substantially less than the transverse dimension of the endless conveyor 42 so that the speed at which the product is transported from the endless conveyor 42 to the inlet portion of the viner must be increased to prevent an accumulation of the product in front of the viner inlet opening. The product feed apparatus has a base plate portion 60 with a pair of longitudinally extending semicircular recess portions 62 and 64. In top plan, as illustrated in FIG. 3, the base plate portion 60 has a generally triangular appearance with side portions 66 and 68 converging toward the outlet end portion 70 of the product feed apparatus 44. A pair of screw type conveyors 72 and 74 are positioned in the trough like recesses 62 and 64. The screw type conveyors 72 and 74 have shafts 76 and 78 with end portions 80 and 82 suitably mounted in bearings 84 and 86. Sprockets 88 and 90 are secured to the respective shafts 76 and 78 and have a chain 92 reeved therearound in a manner that the endless screw conveyors 72 and 74 rotate in timed relation in the direction illustrated in FIG. 4. The chain 92 is reeved around a sprocket 94 secured to a hydraulic motor 96. Thus the motor 96 upon actuation rotates the screw conveyors 72 and 74 in the direction illustrated in FIG. 4 and rapidly conveys the product, foliage and vines intermixed therewith upwardly into the inlet portion of the viner at a preselected speed.

The endless conveyor 42 has a transverse dimension substantially wider than the two screw conveyors 72 and 74 and portions of the product from the conveyor 42 are deposited on the surfaces 98 and 100 on opposite sides of screw conveyors 72 and 74. A pair of gathering arms 102 and 104 are provided to gather the product deposited on surfaces 98 and 100 and direct the product into the troughs 62 and 64 where the screw conveyors 72 and 74 are effective in conveying the product upwardly into the inlet of the viner. The gathering arms are similar in construction and include a rotatable disc 106 having an end portion 108 of the arm 102 secured thereto adjacent the periphery thereof. The other end of the arm has a rearwardly extending plate 110 from which rod 112 depends. The rod 112 is positioned in a channel 114 formed in the base plate 60. Suitable drive means are provided to rotate the disc 106 at a preselected speed. The rotation of disc 106 moves the arm 102 toward and away from the trough 62 in a manner to direct the product toward the trough 62. With this arrangement the conveyor 42 deposits the product on the upper surface of base plate 60 and the gathering arms 102 and 104 direct the product on surfaces 98 and 100 toward the screw conveyors 72 and 74. The screw conveyors 72 and 74 then rapidly convey the product into the inlet opening of the viner reel.

Figure 2:
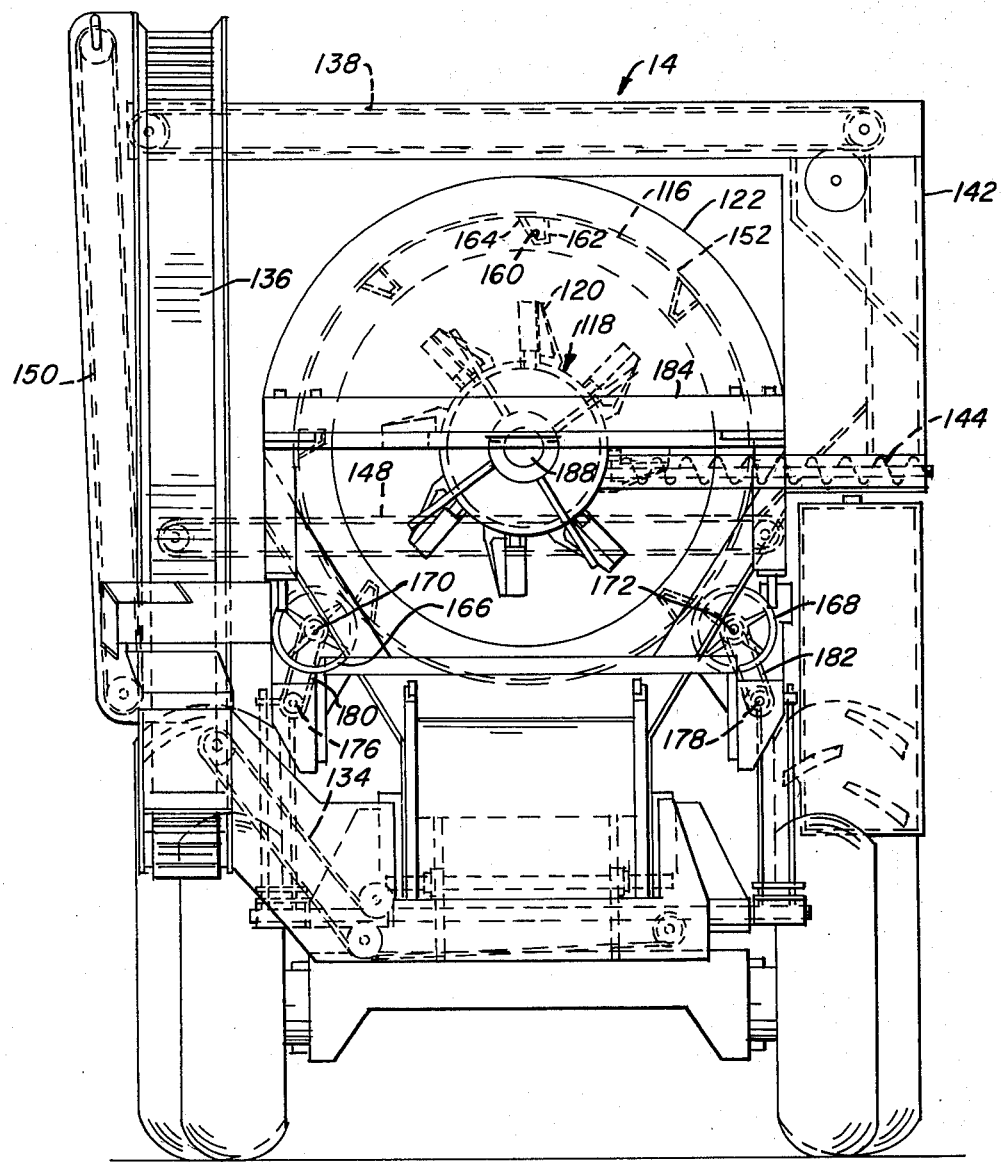
FIG. 2 is a view in end elevation of the discharge end portion of the combine illustrated in FIG. 1B.
Figure 11:
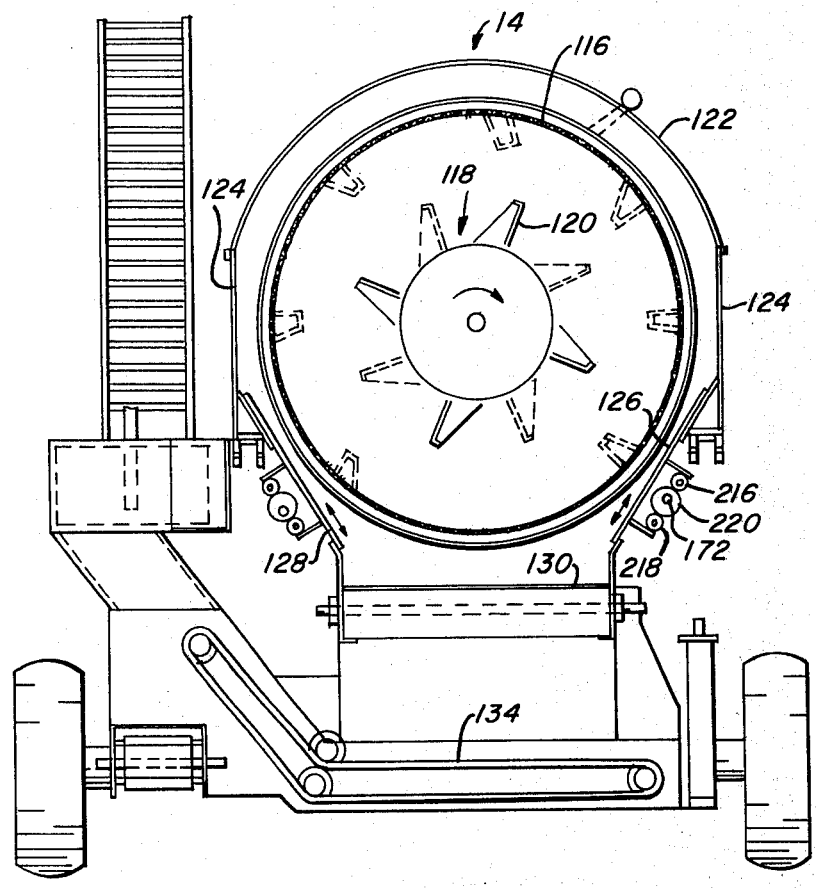
FIG. 11 is a view in end elevation similar to FIG. 2 with parts removed, illustrating the housing for the viner and the oscillating sideboard portions of the housing.

Referring to FIGS. 1B, 2 and 11 the thresher or viner generally designated by the numeral 14 is illustrated. The thresher 14 is arranged to remove the beans, peas or the like from the pods with a rotating reel and an impeller and convey the beans or peas through the foraminous reel onto a conveyor positioned therebelow. The thresher 14 is also referred to as a viner and is similar in many respects to the viner illustrated and described in U.S. Pat. No. 2,768,628. The disclosure of U.S. Pat. No. 2,768,628 is incorporated herein by reference.

The thresher 14 includes a cylindrical reel generally designated by the numeral 116 rotatably supported on the main frame 16 and an impeller generally designated by the numeral 118 positioned within the reel 116. The impeller 118 is separately driven and, as later described, has radially extending beaters 120. A housing 122 extends around the reel 116 and has vertical walls 124 (FIG. 11) and a pair of inclined movable walls 126 and 128. The walls or sideboards 126 and 128 are arranged to oscillate linearly and discharge the product passing through the reel 116 onto an endless conveyor 130 positioned therebeneath. The endless conveyor 130 then conveys the product to a foliage separating station generally designated by the numeral 132 and illustrated in detail in FIG. 6.

The foliage is separated from the product and the product falls by gravity onto a transverse endless conveyor 134 where it is conveyed upwardly onto an elevating conveyor 136 (FIG. 2). The product from the elevating conveyor 136 is deposited on an elevated transverse conveyor 138 and transported to a hopper 140 as illustrated in FIG. 1A. The elevated transverse conveyor 138 is preferably a foraminous conveyor through which the product passes and is deposited in a hopper 140 illustrated in FIG. 1A. The foliage and product remaining on the upper reach of the conveyor 138 are deposited in a vertical receiver 142 which has a bottom opening connected by transverse screw conveyor 144 (FIGS. 1A and 2). The transverse screw conveyor 144 conveys the product and foliage to the product feed apparatus 44 where it again is fed into the thresher 14.

As illustrated in FIG. 1A the hopper 140 has a bottom opening 146 with a transverse belt conveyor 148 positioned therebeneath. When it is desired to empty the hopper 140 the transverse belt conveyor 140 is energized to convey the product to the side of the vehicle. An inclined discharge conveyor 150 is pivoted beneath the transverse conveyor 148 and has its discharge end portion preferably positioned over a separate receiver for the product. The product is removed from the hopper 140 by the conveyor 148 and discharged onto the conveyor 150. The discharge conveyor then conveys the product to a separate mobile receiver positioned adjacent the combine.

Figure 9:
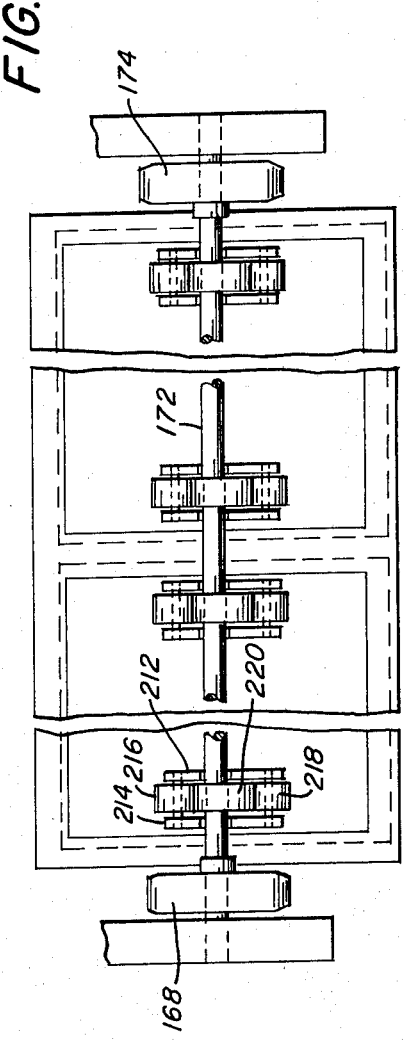
FIG. 9 is a fragmentary view in side elevation of the oscillating sideboard portions of the housing surrounding the viner.

Now referring in detail to the reel 116 and the impeller 118 illustrated in detail in FIGS. 2 and 11, the reel 116 has a generally cylindrical configuration and has a foraminous wall 152 having apertures of a preselected size. As diagrammatically illustrated in FIG. 10 the reel 116 has annular end portions 154 and 156 and longitudinal rib members 158 providing a suitable frame for the foraminous screen 152. Secured to the inner portion of the screen 152 are a plurality of inwardly extending ribs 160 each having a vertical side portion 162 and an inclined side portion 164. The ribs 160 are positioned equidistantly around the inner surface of the screen 152 and extend radially inwardly toward the impeller 118. The ribs 160 are so arranged so that upon rotation of the reel 116 in a clockwise direction, as viewed in FIG. 2, the product will strike the vertical walls 162 of ribs 160. When the reel is rotated in a counter-clockwise direction, as viewed in FIG. 2, the product will strike the inclined walls 164 of ribs 160.

Where a relatively tender product, such as peas, is being harvested it is preferable to rotate the reel so that the product and pods strike the inclined walls 164 and thus minimize bruising the shelled product. The reel is rotatably supported at its rear end portion on pairs of driving wheels 166 and 168 that abut the annular end portion 156 illustrated in FIG. 10. The driving wheels 166 and 168 are mounted on shafts 170 and 172 that extend forwardly along the sides of the housing inclined side plates 126 and 128. Similar pairs of drive wheels are connected to the front end of the respective shafts 170 and 172 and abut the annular end portion 154 illustrated in FIG. 10. In FIG. 9 the shaft 172, drive wheel 168 and one of the front drive wheels designated by the numeral 174 are illustrated. With this arrangement the reel 116 is rotatably supported and driven by the respective pairs of wheels 166 and 168 and similar pairs of wheels adjacent the front end of the reel 116.

The shafts 170 and 172 are driven by means of motors 176 and 178 and drive chains 180 and 182. The motors 176 and 178 are preferably fluid driven reversible motors that permit the reel 116 to be rotated in either a clockwise or counterclockwise direction at a preselected speed. The annular end portions 154 and 156 abut suitable roller bearings to prevent axial movement of the reel and to maintain the reel in operative position relative to the drive wheels 166 and 168.

An impeller or beater 118 is positioned within the reel 116 and is supported on a frame member 184 for independent rotation relative to the reel 116. The impeller has a shaft 186 (FIG. 10) with a rear end portion 188 that is rotatably supported in a suitable bearing on the frame 184. The shaft front end portion 190 is also rotatably supported in a bearing and connected to a drive motor 191 (FIG. 1A) by a suitable sprocket arrangement so that the impeller 118 rotates in a preselected direction; either the same or opposite direction to that of the reel 116. The impeller 118 has a tubular portion 192 secured to the shaft 186 by means of a circular front plate 194 and a circular rear plate 196. A plurality of radially extending impeller blades 198 are secured to the front end of the impeller 118 and are arranged to propel the product, foliage and vines inwardly into the reel 116. Other impeller blades 200 are secured to the discharge end portion of the impeller 118 and assist in propelling the vines and foliage out of the reel 116.

Figure 10:
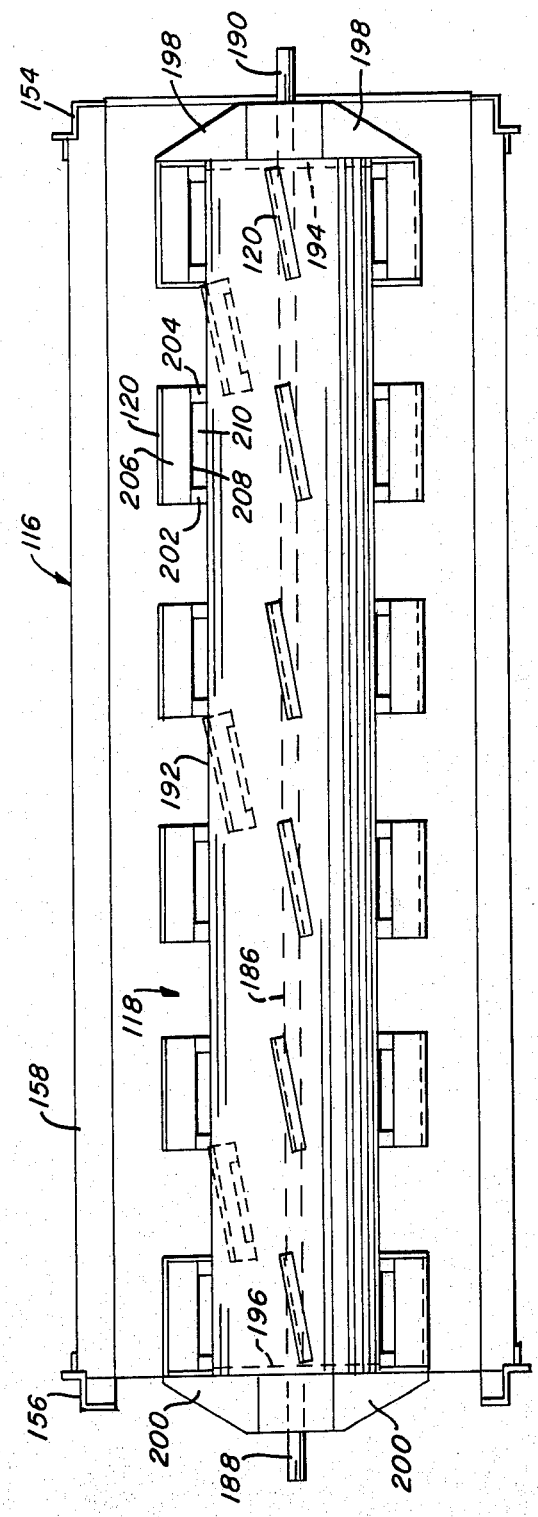
FIG. 10 is a detailed view of the impeller positioned within the cylindrical viner.

The impeller has a plurality of beaters 120 secured thereto in longitudinal rows along the outer surface of the tube 192. As illustrated in FIGS. 2 and 10 the beaters 120 have pairs of vertical legs 202 and 204 with a plate member 206 secured thereto. The plate member has a lower edge portion 208 that is spaced from the surface of tube 192 to provide an opening 210 therebetween. The beaters 120 are arranged in longitudinal rows along the surface of tube 192 and extend radially therefrom. Several of the rows of beaters 120 are longitudinally aligned on the surface of tube 192. The other rows of beaters 120 are inclined relative to the longitudinal axis of the impeller 118 in a direction to convey the product, foliage and vines through the reel 116 while the pods are being opened and the product discharged through the openings in the reel 116. The opening 210 between the tube 192 and the plate 206 of beaters 120 provides air flow through the opening 210 which minimizes the creation of convective currents that propel and impinge the product, pods, foliage and vines against the inner surface of reel 116. This feature increases the product separation efficiency of the thresher 14 so that larger volumes of product may be handled per unit time as compared with the threshers having solid beaters rather than the beaters herein disclosed.

Figure 7:
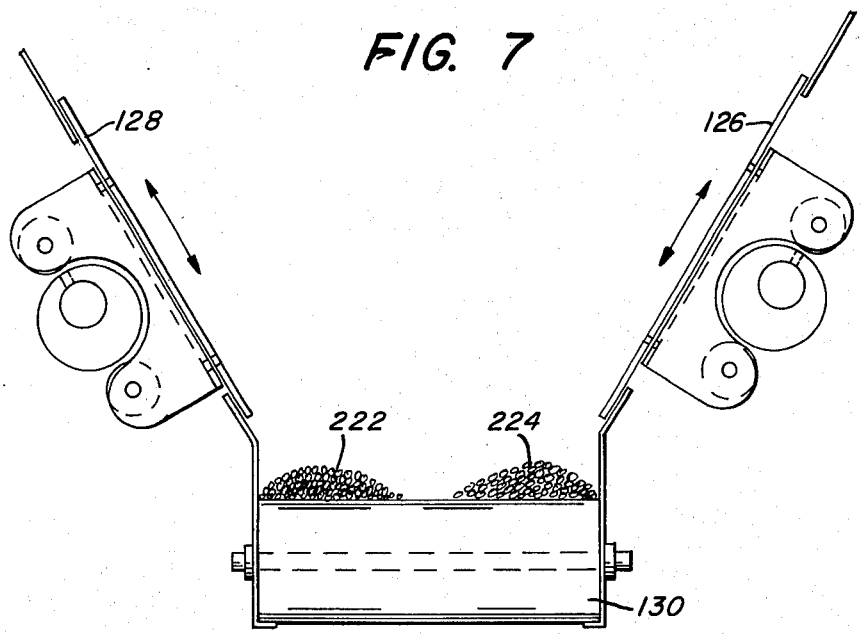
FIG. 7 is a fragmentary view in end elevation taken along the line VII—VII of FIG. 6, illustrating the oscillating sideboard portion of the housing enclosing the viner and the manner in which the product is unevenly deposited on the conveyor belt.
Figure 8:
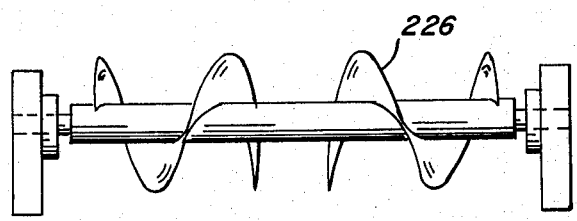
FIG. 8 is a fragmentary view in end elevation taken along the line VIII—VIII of FIG. 6, illustrating the twin screw product distributor positioned adjacent to the discharge end of the conveyor belt to evenly distribute the product.

As previously discussed the housing 122 includes a pair of inclined sideboards that are illustrated in FIG. 11. The sideboards are schematically illustrated in FIGS. 7 and 9 and in end elevation in FIG. 11. The sideboards 126 and 128 each include a plurality of pairs of outwardly extending plates 212 and 214. Rollers 216 and 218 are rotatably secured to the pairs of plates 212 and 214. The rollers 216 and 218 abut an eccentric member 220 that is secured to the drive shaft 172. The eccentric member 220 is positioned between the rollers 216 and 218 so that rotation of drive shaft 172 rotates the eccentric 220 and by means of the rollers 216 and 218 oscillates the sideboards 126 and 128 in a linear direction as illustrated by the arrows. The oscillation of the sideboards 126 and 128 in the direction indicated prevents the accumulation of the product that passes through the screen 216 thereon and discharges the product onto the endless conveyor belt 130.

Figure 6:
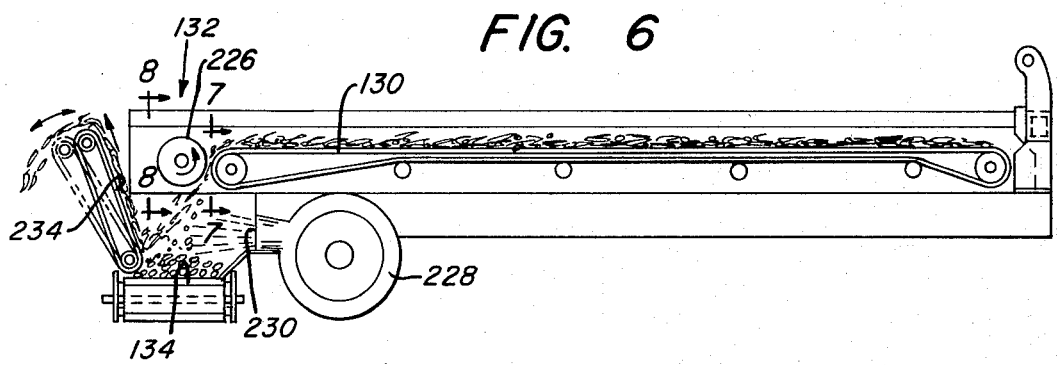
FIG. 6 is a fragmentary view in side elevation of the product conveyor positioned beneath the viner portion of the harvester.

As viewed in FIG. 7 the product discharged by sideboards 126 and 128 accumulates on the top reach of endless conveyor belt 130 in two longitudinal piles designated by the numerals 222 and 224. The piles are adjacent the side portions of the conveyor belt 130. The product also contains a small amount of foliage, stems etc. which should be separated therefrom before the product is deposited in the hopper 140. In order to efficiently separate the foliage and other extraneous material from the product it is desirable to distribute the product as an even curtain before it is subjected to an air blast for gravity separation. In FIG. 6 there is clearly illustrated the endless conveyor 130 that conveys the product and extraneous impurities toward the rear of the thresher 14. The two longitudinal piles of product and extraneous material 222 and 224 are discharged from the endless conveyor 130 onto a twin screw 226 that is rotating in the direction illustrated in FIG. 6. The twin screw has portions that receive the two piles of the product 222 and 224 adjacent the edges thereof and direct the piles of product 222 and 224 toward the center of the twin screw. With this arrangement the piles 222 and 224 are evenly distributed so that a substantially even curtain of product and foliage is discharged from the twin screw downwardly toward the endless conveyor 134.

A blower 228 has an outlet portion 230 that directs a stream of air under pressure against the curtain of product and foliage discharged from the twin screw 226. The velocity of the air is sufficient to pick up and impinge the foliage and vines against the upwardly extending endless conveyor 232. The product, i.e. peas or beans, has a sufficient weight to fall by gravity onto the endless conveyor 134 and be conveyed transversely to the elevating conveyor 136 as previously described. The foliage adheres to the conveying reach of the conveyor 134 and is discharged from the thresher 14 as is diagrammatically illustrated. With this arrangement the impurities contained in the product are separated therefrom by the air blast from the blower 228 and discharged from the thresher 14 by means of the endless conveyor 232. As indicated in FIG. 6 the slope of the endless conveyor is adjustable to accurately control the foliage and vines adhering to the conveyor by the air blast and being conveyed on the conveyor as previously described.

According to the provisions of the patent statutes, I have explained the principle, preferred construction and mode of operation of my invention and have illustrated and described what I now consider its best embodiments. It should be understood that the invention is not limited to the particular embodiments described herein but may be variously practiced within the scope of the following claims.

I claim:

1. In a pod combine for harvesting the edible product of leguminous plants comprising, a mobile frame, a harvester and thresher mounted in tandem on said mobile frame, said thresher having an inlet end portion, said harvester operable to remove the unopened pods, a portion of the foliage and vines from the plants, said thresher operable to open said pods and remove the product therefrom and separate said product from substantially all of said pods, vines and foliage.

feed means positioned on said frame between said harvester and said thresher for feeding the material harvested by said harvester into said thresher inlet end portion, an endless belt conveyor operable to convey said material harvested by said harvester to said feed means, said endless belt conveyor having a transverse dimension substantially greater than the diameter of said thresher inlet end portion, said feed means including a pair of screw type conveyors extending longitudinally between said harvester and said thresher inlet portion, said pair of screw type conveyors being operable to transport the harvester material at a speed greater than said endless belt conveyor to prevent an accumulation of the material at said thresher inlet portion, separator means for separating a minor portion of said foliage discharged from said thresher from said product removed from said pods by said thresher, said separator means positioned on said frame in material receiving relation with said thresher to receive a minor portion of said foliage and said product discharged from said thresher after said thresher has removed the product from the pods, first conveying means positioned longitudinally beneath said thresher on said frame for conveying said product and a minor portion of said foliage discharged from said thresher to said separator means, product distributor means rotatably positioned adjacent the discharge end of said first conveying means for evenly distributing a minor portion of said foliage and said product discharged from said first conveying means in a curtain of material into the path of said separator means, second conveying means positioned on said frame in material receiving relation with said separator means to convey said product from said separator means to a storage means.

2. A pod combine as set forth in claim 1 in which said feed means includes, a plate member secured to said frame and positioned between said harvester and said inlet end portion of said thresher, said plate member having a pair of trough portions extending longitudinally between said harvester and said inlet end portion of said thresher, said pair of screw type conveyors positioned in said pair of longitudinally extending trough portions, means drivingly connected to said screw conveyors to rotate said screw conveyors in timed relation to convey said material into the inlet end portion of said thresher at a speed greater than the speed said endless belt conveyor conveys said material to said screw conveyor;

a pair of circular disc members forming a portion of said plate member top surface, each of said disc members positioned on opposite sides of said pair of longitudinally extending trough portions, a pair of arm members each secured at one end to said disc members adjacent the peripheral edge portion thereof, means movably supporting the other end portion of said arm members on said plate member, and means drivingly connected to said disc members for rotating said disc members to move portions of said arm members toward and away from said pair of longitudinal trough portions to move said material deposited on said plate member top surface by said endless belt conveyor toward said pair of longitudinally extending trough portions.

3. A pod combine as set forth in claim 1 which includes, said thresher including a rotatable reel portion, a housing surrounding said rotatable reel portion of said thresher, said housing including a pair of inclined sideboards extending downwardly toward the side edge portions of said first conveyor means with said side edge portion positioned within the confines of said inclined sideboards, drive means secured to said sideboards to linearly oscillate said sideboards and discharge the material that passes through said reel portion onto said endless conveyor to thereby prevent the accumulation of material on said sideboards.

4. A pod combine as set forth in claim 3 in which said drive means includes, a pair of drive shafts rotatably supported adjacent to said inclined sideboards and extending longitudinally on opposite sides of said thresher reel, said drive shafts having a plurality of eccentric members mounted thereon and rotatable therewith, said sideboards having roller members rotatably mounted thereon on opposite sides of said eccentric members in juxtaposition therewith, means connected to said drive shafts to rotate said drive shafts to thereby oscillate said inclined sideboards through said eccentric members and said roller members.

5. A pod combine as set forth in claim 4 in which, each of said sideboards is arranged to oscillate in a linear plane parallel to the inner surface of said sideboards, 6. A pod combine as set forth in claim 1 which includes, said thresher including a rotatable reel portion, said thresher reel including a cylindrical foraminous wall and a pair of annular end ring members, a plurality of longitudinally extending rib members secured to the inner surface of said cylindrical foraminous wall, said rib members extending radially inwardly toward the axis of said reel, said rib members positioned in sapced relation to each other on the inner surface of said cylindrical foraminous wall, said rib members having a longitudinally extending vertical wall and a longitudinally extending inclined wall, said rib members arranged upon rotation in a preselected direction to strike said material conveyed into said reel by either said vertical wall or said inclined wall of said rib members depending upon the direction of rotation of said reel, a housing surrounding said thresher reel, a pair of drive shafts rotatably supported adjacent to and extending longitudinally on opposite sides of said thresher reel, wheel members mounted on both of said drive shafts in abutting relation with said ring members, drive means connected to said drive shafts to rotate said drive shafts to thereby rotate said reel through said wheel members in a preselected direction.

7. A pod combine as set forth in claim 6 which includes, inclined sideboards movably secured to said housing and positioned on opposite sides of said reel, said sideboards arranged to receive material conveyed through said cylindrical foraminous wall, said first conveyor means positioned longitudinally beneath said reel and arranged to receive material discharged from said inclined sideboards, means connected to said drive shafts and arranged to linearly oscillate said sideboards during rotation of said reel by said wheels.

8. A pod combine as set forth in claim 1 in which, said first conveyor means being arranged to receive and convey the product discharged from said thresher rearwardly thereof, said second conveying means including a transverse conveyor positioned on said frame beneath the discharge end of said first conveying means and a first inclined endless conveyor having a receiving end portion positioned in material receiving relation with said transverse conveyor and a discharging end portion positioned in material discharging relation with said storage means, a second inclined endless conveyor positioned adjacent the discharge end of said first conveying means, said separator means including an air blast means positioned rearwardly of said discharge end of said first conveying means and above said transverse conveyor, said air blast means arranged to separate by gravity said product from said foliage and impinge said separated foliage on said second inclind endless conveyor with said product arranged to fall by gravity on said transverse conveyor for delivery to said first inclined endless conveyor and therefrom to said storage means.

9. A pod combine as set forth in claim 1 in which, said product distributor means includes a screw type conveyor having oppositely convoluted screw portions arranged to receive material adjacent the end portions of said screw type conveyor and convey portions of said material thereon toward the center of said screw type conveyor.

10. A pod combine as set forth in claim 1 which includes, said thresher including a rotatable reel portion having a cylindrical foraminous wall, a plurality of rib members secured to the inner surface of said foraminous wall, said rib members extending radially inwardly toward the axis of said reel, said rib members positioned in spaced relation to each other and on the inner surface of said cylindrical foraminous wall, said rib members having a longitudinally extending vertical wall and a longitudinally extending inclined wall, said rib members arranged upon rotation in a preselected direction to strike said material conveyed into said reel by either said vertical wall or said inclined wall of said rib members, an impeller member rotatably mounted within said reel, said impeller member axially aligned with the axis of said reel, said impeller member having a plurality of beaters extending radially therefrom, said beaters having openings therein to permit air to pass therethrough.

11. A pod combine as set forth in claim 10 in which said impeller member includes a plurality of beaters extending radially therefrom, rows of said beaters positioned longitudinally on said impeller, other rows of said beaters arranged longitudinally and angularly relative to the longitudinal axis of said impeller to convey the product introduced into said reel.

12. A pod combine for harvesting the edible leguminous plants comprising, a mobile frame, a harvester and thresher mounted in tandem on said mobile frame, said thresher including a rotatable reel portion, said harvester operable to remove the unopened pods, a portion of the foliage and vines from the plants, said thresher operable to open said pods and remove the product therefrom and separate said product from substantially all of said pods, vines and foliage, feed means positioned on said frame between said harvester and said thresher for feeding the material harvested by said harvester into said thresher rotatable reel portion, an endless belt conveyor operable to convey said material harvested by said harvester to said feed means, separator means for separating a minor portion of said foliage discharged from said thresher from said product removed from said pods by said thresher, said separator means positioned on said frame in material receiving relation with said thresher to receive a minor portion of said foliage and said product discharged from said thresher after said thresher has removed the product from the pods, first conveying means positioned longitudinally beneath said thresher on said frame for conveying said product and a minor portion of said foliage discharged from said rotating reel to said separator means, said separator means including means to separate said product from said foliage, second conveying means positioned on said frame in material receiving relation with said separator means to convey said product from said separator means to a storage means, a housing surrounding said rotating reel portion, said housing including a pair of inclined sideboards extending downwardly toward the side edge portions of said first conveyor means with said side edge portions positioned within the confines of said inclined sideboards, a pair of drive shafts rotatably supported adjacent to said inclined sideboards and extending longitudinally on opposite sides of said thresher reel, said drive shafts having a plurality of eccentric members mounted thereon and rotatable therewith, said sideboards having roller means rotatably mounted thereon on opposite sides of said eccentric members in juxtaposition therewith, and means connected to said drive shafts to rotate said drive shafts to thereby oscillate said inclined sideboards through said eccentric members and said roller means.

13. A pod combine for harvesting the edible leguminous plants comprising, a mobile frame, a harvester and thresher mounted in tandem on said mobile frame, said thresher including a rotatable reel portion, said harvester operable to remove the unopened pods, a portion of the foliage and vines from the plants, said thresher operable to open said pods and remove the product therefrom and separate said product from substantially all of said pods, vines and foliage, feed means positioned on said frame between said harvester and said thresher for feeding the material harvested by said harvester into said thresher rotatable reel portion, an endless belt conveyor operable to convey said material harvested by said harvester to said feed means, separator means for separating a minor portion of said foliage discharged from said thresher from said product removed from said pods by said thresher,
said separator means positioned on said frame in material receiving relation with said thresher to receive a minor portion of said foliage and said product discharged from said thresher after said thresher has removed the product from the pods,
first conveying means positioned longitudinally beneath said thresher on said frame for conveying said product and a minor portion of said foliage discharged from said rotating reel to said separator means,
said separator means including means to separate said product from said foliage,
second conveying means positioned on said frame in material receiving relation with said separator means to convey said product from said separator means to a storage means,
said thresher reel including a cyclindrical foraminous wall and a pair of annular end ring members,
a plurality of longitudinally extending rib members secured to the inner surface of said cylindrical foraminous wall, said rib members extending radially inwardly toward the axis of said reel, said rib members positioned in spaced relation to each other on the inner surface of said cylindrical foraminous wall, and
said rib members having a longitudinally extending vertical wall and a longitudinally extending inclined wall, said rib members arranged upon rotation in a preselected direction to strike said material conveying into said reel by said vertical wall or said inclined wall of said rib members depending upon the direction of rotation of said reel.

* * * * *